US012516503B2

(12) United States Patent
Minematsu et al.

(10) Patent No.: US 12,516,503 B2
(45) Date of Patent: Jan. 6, 2026

(54) METHOD FOR CONTROLLING WORKING MACHINE AND WORKING MACHINE

(71) Applicant: Yanmar Holdings Co., Ltd., Osaka (JP)

(72) Inventors: Shunsuke Minematsu, Chikugo (JP); Hiroki Kabata, Chikugo (JP); Valentin Graveline, Saint-Dizier (FR)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/938,257

(22) Filed: Nov. 5, 2024

(65) Prior Publication Data

US 2025/0146256 A1 May 8, 2025

(30) Foreign Application Priority Data

Nov. 6, 2023 (EP) .................................... 23207989

(51) Int. Cl.

*E02F 9/22* (2006.01)
*F15B 13/02* (2006.01)
*F15B 20/00* (2006.01)

(52) U.S. Cl.

CPC .............. *E02F 9/22* (2013.01); *E02F 9/2285* (2013.01); *F15B 13/027* (2013.01); *F15B 20/00* (2013.01)

(58) Field of Classification Search

CPC ........ F15B 2211/7741; F15B 2211/353; F15B 11/003; F15B 2211/41554; E02F 9/2285
See application file for complete search history.

(56) References Cited

U.S. PATENT DOCUMENTS

| | | | | |
|---|---|---|---|---|
| 3,472,127 A * | 10/1969 | Scheidt | ..................... | E02F 9/22 60/482 |
| 9,127,437 B2 * | 9/2015 | Hand | ..................... | E02F 9/2217 |
| 2004/0221714 A1 * | 11/2004 | Bitter | ..................... | B66F 9/0655 91/436 |
| 2020/0011352 A1 * | 1/2020 | Jubert | ..................... | F15B 13/042 |

FOREIGN PATENT DOCUMENTS

| | | |
|---|---|---|
| JP | 2005207197 A | 8/2005 |

* cited by examiner

*Primary Examiner* — Abiy Teka
(74) *Attorney, Agent, or Firm* — NORTON ROSE FULBRIGHT US LLP

(57) ABSTRACT

The method for controlling a working machine controls the supply of a working fluid to an actuator that drives a driven object by a pilot signal Si0 of an operation system generated according to the operation of an operation device, thereby moving the driven object bidirectionally between a first position and a second position. The method for controlling the working machine includes preventing a flow of the working fluid in the direction to move the driven object from the second position to the first position by a backflow prevention circuit. The method for controlling the working machine is characterized by further including disabling the backflow prevention circuit by the pilot signal Si0 generated during a specific operation, thereby allowing the flow of the working fluid in the direction to move the driven object from the second position to the first position.

10 Claims, 10 Drawing Sheets

METHOD FOR CONTROLLING WORKING MACHINE AND WORKING MACHINE

CROSS-REFERENCE TO RELATED APPLICATION

This application claims priority under 35 U.S.C. § 119 to Japanese Patent Application No. EP 23207989.7, filed on Nov. 6, 2023, the entire contents of which are hereby incorporated by reference in their entireties.

TECHNICAL FIELD

The present invention relates to a method for controlling a working machine used for a working machine including a driven object that is operated using a working fluid, and a working machine.

BACKGROUND ART

As a related art, for example, a working machine including a blade as a driven object is known (e.g., see Patent Document 1). The working machine according to the related art can move the blade up and down with respect to the machine body by using an actuator (blade lifting cylinder) for driving the blade. This working machine includes a directional switching valve (blade lifting control valve), which controls the direction of a working fluid (hydraulic oil) supplied from a hydraulic pump (main hydraulic source) to the actuator and thereby causes the actuator to extend and contract to move the blade up and down.

The directional switching valve described herein has a "float position" in which the actuator (blade lifting cylinder) is communicated with a tank. In this working machine, for example, in leveling work, the blade can be freely moved up and down by its own weight without being fixed by setting the directional switching valve to the float position.

PRIOR ART DOCUMENT

Patent Document

Patent Document 1: JP-A-2005-207197

SUMMARY OF INVENTION

Technical Problem

In the working machine, for example, when the machine body is jacked up using the blade, in order to prevent the machine body from falling due to its own weight, a backflow prevention circuit (fall prevention valve) may be provided to prevent the flow of the working fluid in a direction to lift the blade. However, in the related art described above, in a case where such a backflow prevention circuit is provided, the blade cannot be lifted even when the directional switching valve is at the float position, making it difficult to freely move the blade up and down.

An object of the present invention is to provide a method for controlling a working machine and a working machine that can be easily made multifunctional.

Solution to Problem

A method for controlling a working machine according to one aspect of the present invention controls the supply of a working fluid to an actuator that drives a driven object by a pilot signal of an operation system generated according to the operation of an operation device, thereby moving the driven object bidirectionally between a first position and a second position. The method for controlling the working machine described above includes preventing a flow of the working fluid in a direction to move the driven object from the second position to the first position using a backflow prevention circuit. The method for controlling the working machine described above is characterized by further including disabling the backflow prevention circuit by the pilot signal generated during a specific operation, thereby allowing the working fluid to flow in the direction to move the driven object from the second position to the first position.

A working machine according to one aspect of the present invention controls the supply of a working fluid to an actuator that drives a driven object by a pilot signal of an operation system generated according to the operation of an operation device, thereby moving the driven object bidirectionally between a first position and a second position. The working machine includes a backflow prevention circuit. The backflow prevention circuit prevents the working fluid from flowing in a direction to move the driven object from the second position to the first position. The working machine described above is characterized by further including a disabling circuit. The disabling circuit disables the backflow prevention circuit by the pilot signal generated during a specific operation, thereby allowing the working fluid to flow in the direction to move the driven object from the second position to the first position.

Advantageous Effects of Invention

According to the present invention, it is possible to provide the method for controlling a working machine and the working machine that can be easily made multifunctional.

DESCRIPTION OF EMBODIMENTS

Hereinafter, an embodiment of the present invention will be described with reference to the accompanying drawings. The following embodiment is an example that embodies the present invention and is not intended to limit the technical scope of the present invention.

Embodiment 1

[1] Overall Configuration

Figure 1:
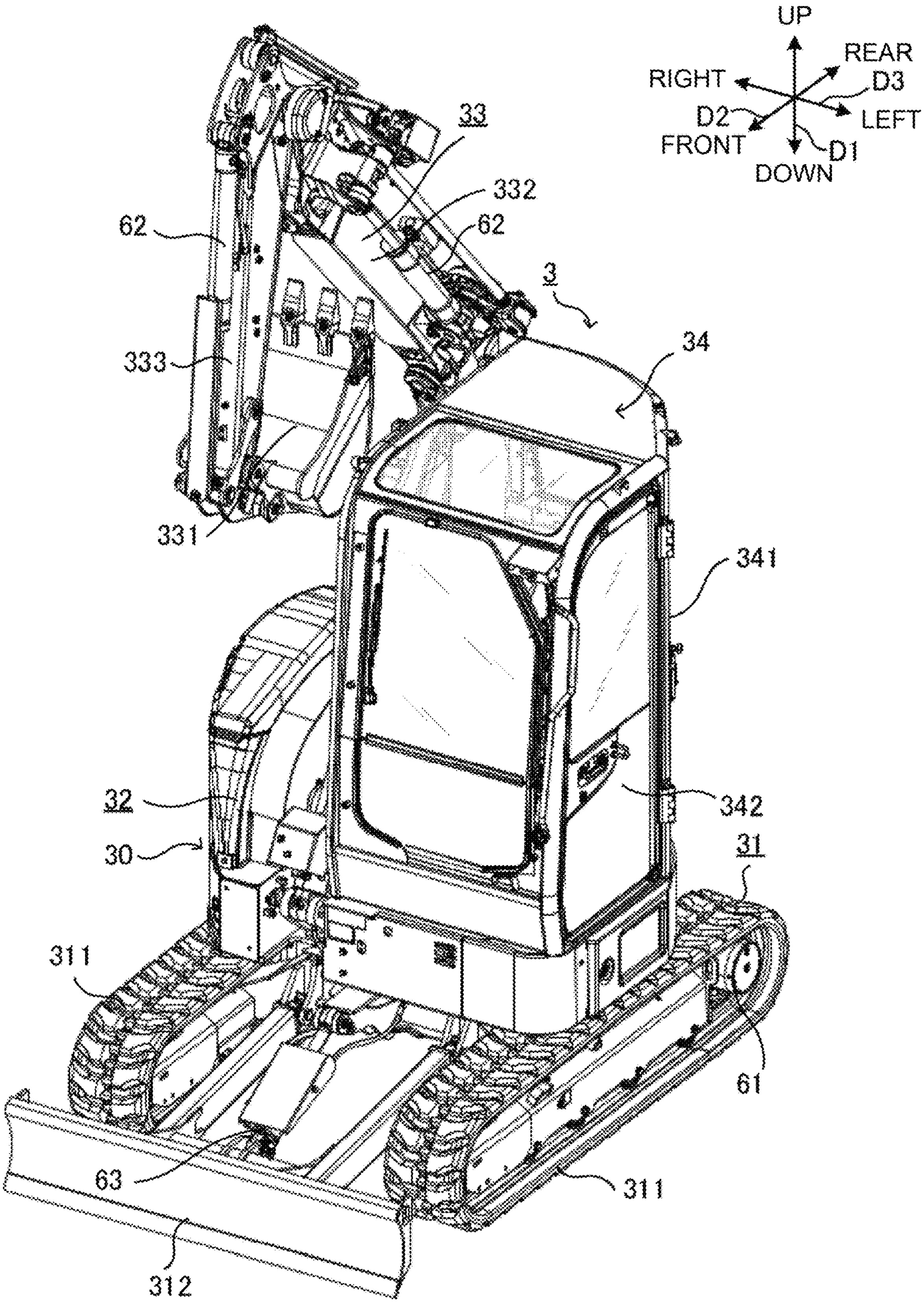
FIG. 1 is a schematic perspective view of a working machine according to an Embodiment 1, viewed from the left front.
Figure 2:
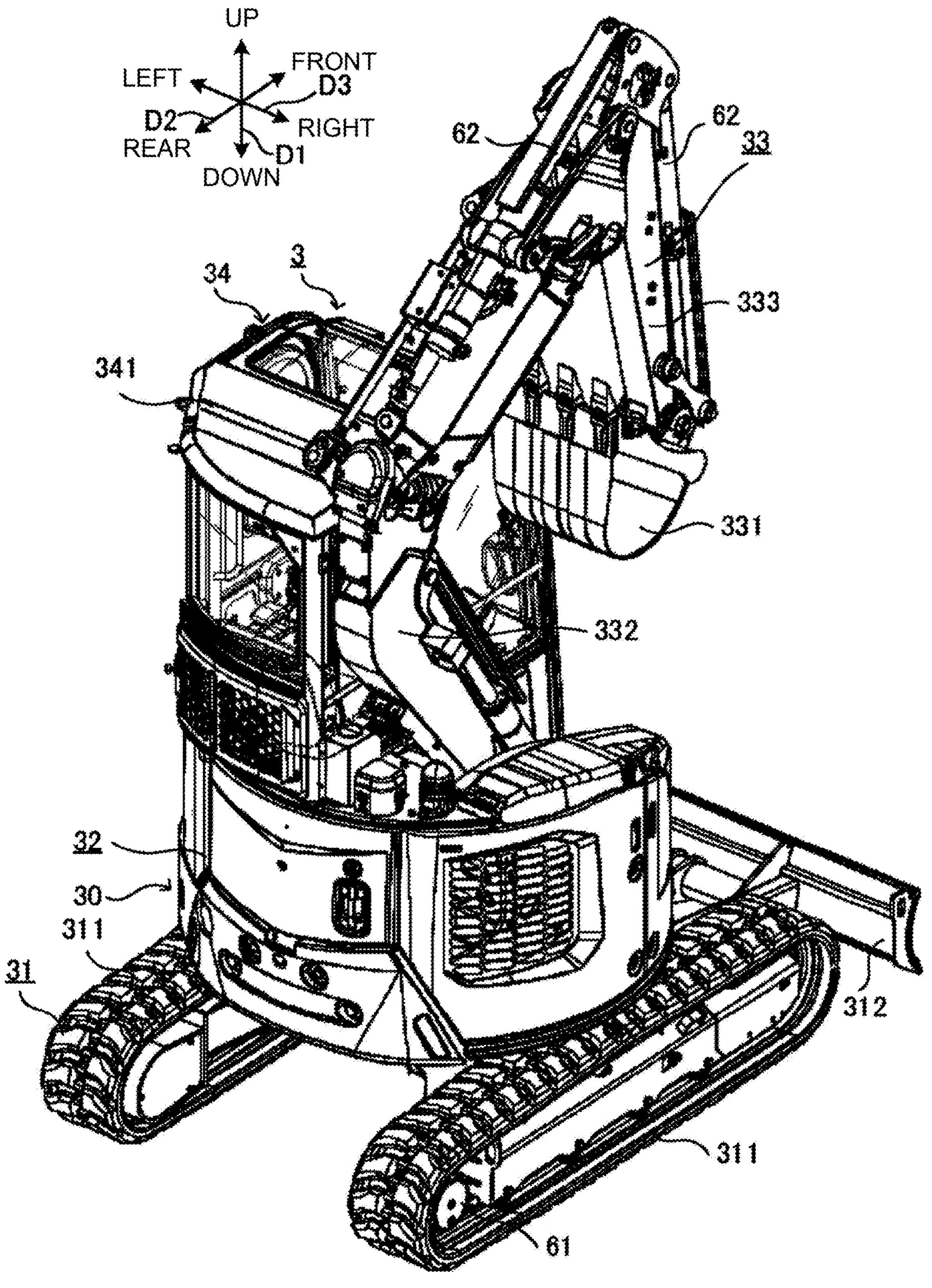
FIG. 2 is a schematic perspective view of the working machine according to the Embodiment 1, viewed from the right rear.
Figure 3:
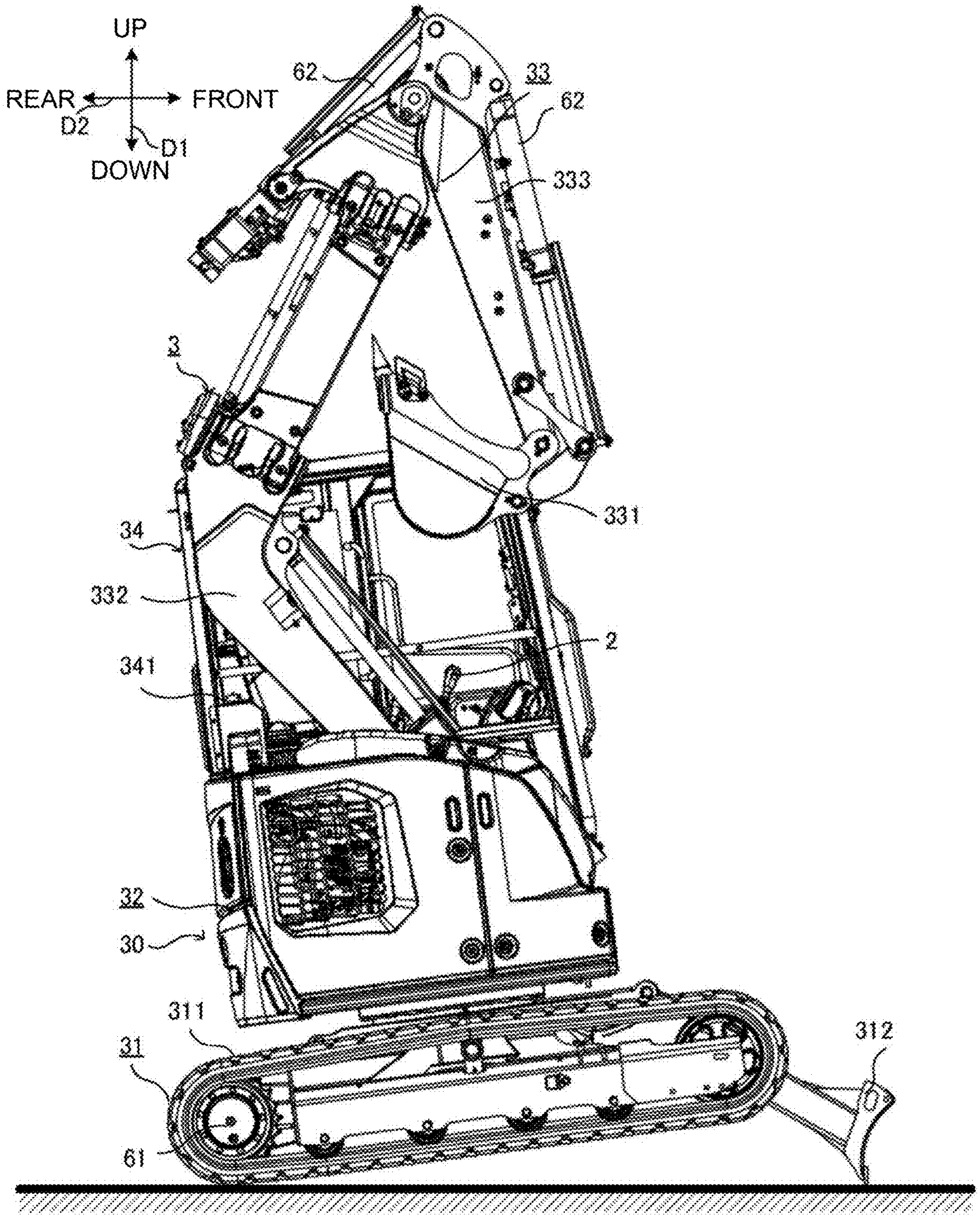
FIG. 3 is a schematic right side view illustrating the working machine according to the Embodiment 1.

A working machine 3 according to the present embodiment includes a traveling portion 31, a turning portion 32, and a working portion 33, as shown in FIG. 1 to FIG. 3. Further, the working machine 3 includes a driving portion 34 on which a passenger can ride. The driving portion 34 includes a driver's seat which is a seat for a passenger to sit on, and the like. In the present embodiment, the traveling portion 31, the turning portion 32, the working portion 33, and the driving portion 34 are included in a machine body 30 of the working machine 3. Further, the working machine 3 further includes an operation device 2 as shown in FIG. 3.

The term "working machine" as used in the present disclosure means various working machines, and examples thereof include working vehicles such as backhoes (including hydraulic excavators, mini excavators, etc.), wheel loaders, and carriers. The working machine 3 includes the working portion 33 configured to be able to perform one or more types of work. The working machine 3 is not limited to "vehicles" and may be, for example, a working vessel, a working projectile such as a drone or a multicopter, or the like. Further, the working machine 3 is not limited to a construction machine and may be, for example, an agricultural machine such as a rice transplanter, a tractor, or a combine harvester. In the present embodiment, unless otherwise specified, a case where the working machine 3 is a riding-type backhoe which can perform excavation work, ground leveling work, trench excavation work, loading work, or the like as a type of work will be described as an example. More specifically, it is assumed that, in the working machine 3 according to the present embodiment, the turning portion 32 including the working portion 33 is of an "ultra-small turning" type that can fully turn within 120% of the total width of the traveling portion 31 (the total width of a pair of left and right crawlers 311) or a "rear ultra-small turning" type with a rear turning radius ratio of 120% or less.

Further, in the present embodiment, as an example, it is assumed that a passenger riding in the driving portion 34 is an operator, and the working machine 3 is moved by the operator's operation. However, the working machine 3 is not limited to this example, and, for example, the working machine 3 may be moved by remote control or automatic driving. Further, the driving portion 34 may allow a plurality of passengers to board at the same time, and in this case, one driving portion 34 may be provided with a plurality of driver's seats.

In the present embodiment, for convenience of explanation, the vertical direction in a state in which the working machine 3 can be used is defined as an up-and-down direction D1. Further, a front-rear direction D2 and a left-right direction D3 are defined with reference to the direction seen by an operator riding on the driving portion 34 of the working machine 3. In other words, each direction used in the present embodiment is a direction defined with reference to the driving portion 34 of the working machine 3, and the direction in which the machine body 30 moves when the working machine 3 moves forward is "front direction" while the direction in which the machine body 30 moves when the working machine 3 moves backward is "rear direction". Similarly, the direction in which a front end of the machine body 30 moves when the working machine 3 turns to the right is "right direction" while the direction in which the front end of the machine body 30 moves when the working machine 3 turns to the left is "left direction". Since the driving portion 34 is provided in the turning portion 32, the front-rear direction D2 and the left-right direction D3 with respect to the traveling portion 31 change as the turning portion 32 turns. Thus, in the following, the direction is defined in a state where the front of the driving portion 34 faces the traveling direction of the traveling portion 31, as shown in FIG. 1. However, these directions are not meant to limit the direction in which the working machine 3 is used (direction during use).

The working machine 3 includes an engine serving as a power source. In the present embodiment, as an example, the engine is a diesel engine. The engine is driven by fuel (light oil in this case) supplied from a fuel tank. In the working machine 3, for example, a hydraulic pump 41 is driven by the engine (see FIG. 5), and the machine body 30 is driven by supplying hydraulic oil from the hydraulic pump 41 to hydraulic actuators (including a hydraulic motor 61, a hydraulic cylinder 62, a hydraulic cylinder 63, etc.) of each part of the machine body 30. Such a working machine 3 is controlled by, for example, an operator on board the driving portion 34 of the machine body 30 operating an operation lever or the like of the operation device 2.

In the present embodiment, as described above, it is assumed that the working machine 3 is a riding-type backhoe. Thus, the working portion 33 is driven according to the operation of the operator on board the driving portion 34 for performing the work such as the excavation work. The working portion 33 is supported by the turning portion 32 including the driving portion 34. Thus, when the turning portion 32 turns, the working portion 33 turns together with the driving portion 34.

The driving portion 34 of the machine body 30 is equipped with the operation device 2, a display device, and the like. The operator can operate the operation device 2 while viewing various pieces of information related to the working machine 3 displayed on the display device. As an example, the display screen of the display device displays information related to an operating state of the working machine 3, such as the cooling water temperature and the hydraulic oil temperature, so that the operator can confirm the information related to the operating state of the working machine 3 necessary for operating the operation device 2 on the display device.

The traveling portion 31 has a traveling function and is configured to be able to travel (including turning) on the ground. The traveling portion 31 includes, for example, a pair of left and right crawlers 311, a blade 312, and the like. The traveling portion 31 includes, as hydraulic actuators, a traveling hydraulic motor 61 for driving the crawlers 311, a lifting hydraulic cylinder 63 for driving the blade 312, and the like. Details of the movement of the blade 312 will be described in the section "[2] Movement of blade".

The turning portion 32 is disposed above the traveling portion 31 and can turn relative to the traveling portion 31 in a plan view. That is, the turning portion 32 is positioned above the traveling portion 31 and is configured to be able to turn relative to the traveling portion 31 around a rotation axis along the vertical direction. The turning portion 32 includes a hydraulic motor or the like as a turning hydraulic actuator. The turning portion 32 is equipped with an engine, a hydraulic pump, and the like in addition to the driving portion 34. Further, the turning portion 32 is provided with a boom bracket to which the working portion 33 is attached. The turning portion 32 has a substantially circular shape with a flat cutout at the front end in a plan view. The turning portion 32 can turn around the center of the circular shape as a rotation axis.

The working portion 33 is supported by the turning portion 32 and is configured to be able to perform one or more types of work. The working portion 33 is supported by the boom bracket of the turning portion 32 and performs the work. The working portion 33 includes a bucket 331. The bucket 331 is a type of attachments (working implements) attached to the machine body 30 of the working machine 3 and is any implement selected from a plurality of types of attachments according to the content of the work. As an example, the bucket 331 is detachably attached to the machine body 30 and replaced according to the content of the work. Examples of the (end) attachments for the working machine 3 include, in addition to the bucket 331, various implements such as a breaker, an auger, a crusher, a fork, a fork claw, a steel frame cutter, an asphalt cutting machine, a grass cutter, a ripper, a mulcher, a tiltrotator, and a tamper.

The working portion 33 further includes a boom 332, an arm 333, the hydraulic actuators (including the hydraulic cylinder 62, the hydraulic motors, etc.), and the like. The bucket 331 is attached to the tip of the arm 333. The bucket 331 is supported by the arm 333 in a manner to be rotatable around a rotation axis along the horizontal direction.

The boom 332 is rotatably supported by the boom bracket of the turning portion 32. Specifically, the boom 332 is supported by the boom bracket in a manner to be rotatable around the rotation axis along the horizontal direction. The boom 332 has a shape extending upward from the base end supported by the boom bracket. The arm 333 is connected to the tip of the boom 332. The arm 333 is supported by the boom 332 in a manner to be rotatable around the rotation axis along the horizontal direction.

The working portion 33 moves by receiving power from the engine serving as a power source. Specifically, the hydraulic pump 41 is driven by the engine, and the hydraulic oil is supplied from the hydraulic pump 41 to the hydraulic actuators (the hydraulic cylinder 62, etc.) of the working portion 33, thereby causing each part of the working portion 33 (the bucket 331, the boom 332, and the arm 333) to move.

Especially in the present embodiment, the working portion 33 has an articulated structure in which the boom 332 and the arm 333 are configured to be individually rotatable. That is, each of the boom 332 and the arm 333 is rotated around the rotation axis along the horizontal direction, so that, for example, the articulated working portion 33 including the boom 332 and the arm 333 can be extended and folded as a whole. Further, the bucket 331 as an attachment is supported by the machine body 30 (the turning portion 32) via the boom 332 and the arm 333, and the bucket 331 can be opened and closed by rotating the bucket 331 itself with respect to the arm 333.

Each of the traveling portion 31 and the turning portion 32 also moves by receiving the power from the engine serving as a power source, similarly to the working portion 33. That is, the turning portion 32 and the traveling portion 31 are caused to move by supplying the hydraulic oil from the hydraulic pump 41 to the hydraulic motor 61 of the traveling portion 31, the hydraulic motor of the turning portion 32, and the like.

Further, the working machine 3 further includes a driving device (mechanism) such as power take-off (PTO) for supplying the power to the bucket 331 (attachment). Specifically, the driving device sends the hydraulic oil from the hydraulic pump driven by the engine to the bucket 331, and the amount of the power supplied to the bucket 331 is adjusted by adjusting a flow rate of the hydraulic oil.

The driving portion 34 is a space for the operator to board and is positioned above the turning portion 32 in the present embodiment. Thus, when the turning portion 32 turns in a plan view, the driving portion 34 also turns together. Specifically, when the turning portion 32 is divided into two in the left-right direction D3, the driving portion 34 is provided on its left side. The driving portion 34 includes at least a driver's seat on which the operator is seated.

Types of the driving portion 34 of the working machine 3 such as a construction machine include a cabin type, a canopy type, a floor type, and the like. The cabin-type driving portion 34 includes a cabin 341, and the operator boards in a cabin space inside the cabin 341. The canopy-type driving portion 34 includes a canopy (roof), and the operator boards in a space below the canopy. The floor-type driving portion 34 does not include the cabin 341, the canopy, or the like, and the operator boards in a space opened upward. That is, the driving portion 34 can include not only an aspect in which the periphery is surrounded by panels or the like, but also various aspects prepared as a space in which the operator can board. In the present embodiment, a case where the driving portion 34 is of a cabin type will be described as an example.

In the present embodiment, the driving portion 34 is positioned above the left crawler 311 (see FIG. 1). With such an arrangement, the operator gets on and off the driving portion 34 from the left side of the driving portion 34. Thus, in the present embodiment, a door 342 of the driving portion 34 is disposed on the left side of the driving portion 34 in the left-right direction D3. That is, the operator gets on and off the driving portion 34 through the door 342 disposed on the left side of the driving portion 34.

The cabin-type driving portion 34 includes the cabin 341 shaped to cover the driver's seat. The cabin 341 constitutes a contour of the driving portion 34, and the operator gets in (inside) the cabin 341. With the door 342, the cabin 341 surrounds four sides of the cabin space.

The operation device 2 is disposed in the driving portion 34 of the machine body 30 and serves as a user interface for receiving an operation input by a user (operator). The operation device 2 includes, for example, an operation lever 21 (see FIG. 5) for operating the blade 312, and the like. The operation device 2 controls a remote control valve 45 (see FIG. 5) according to the amount of operation of the operation lever 21. In this manner, the operator can operate the remote control valve 45 by operating the operation device 2 to instruct the direction and flow rate of the hydraulic oil from the hydraulic pump 41, and can thereby move the working machine 3.

Further, in addition to the configuration described above, the machine body 30 further includes a display device, a control device, a sound output portion, a communication terminal, a cut-off lever, a fuel tank, a battery, various sensors for detecting detection objects in a monitoring area around the working machine 3, such as a camera that images the surroundings of the machine body 30, and the like. Further, the machine body 30 includes sensors (including cameras) for monitoring an operating status of the machine body 30, such as a coolant temperature sensor, a hydraulic oil temperature sensor, a tachometer to measure an engine speed, and an hour meter to measure an operating time.

The display device is disposed in the driving portion 34 and serves as a user interface for outputting various pieces of information to the operator. The display device is controlled by the control system 1 and presents (outputs) various pieces of information by displaying various screens. The display device may have a sound (including voice) output function in addition to the display function, and present various pieces of information by sound. Further, in the present embodiment, the display device includes an input means such as a touch panel and accepts various operations by the operator by outputting an electrical signal according to the operation by the operator. As a result, the operator can visually recognize the display screen displayed on the display device and operate the display device as necessary.

[2] Movement of Blade

Next, the movement of the blade 312 of the working machine 3 according to the present embodiment will be described with reference to FIG. 4.

Figure 4:
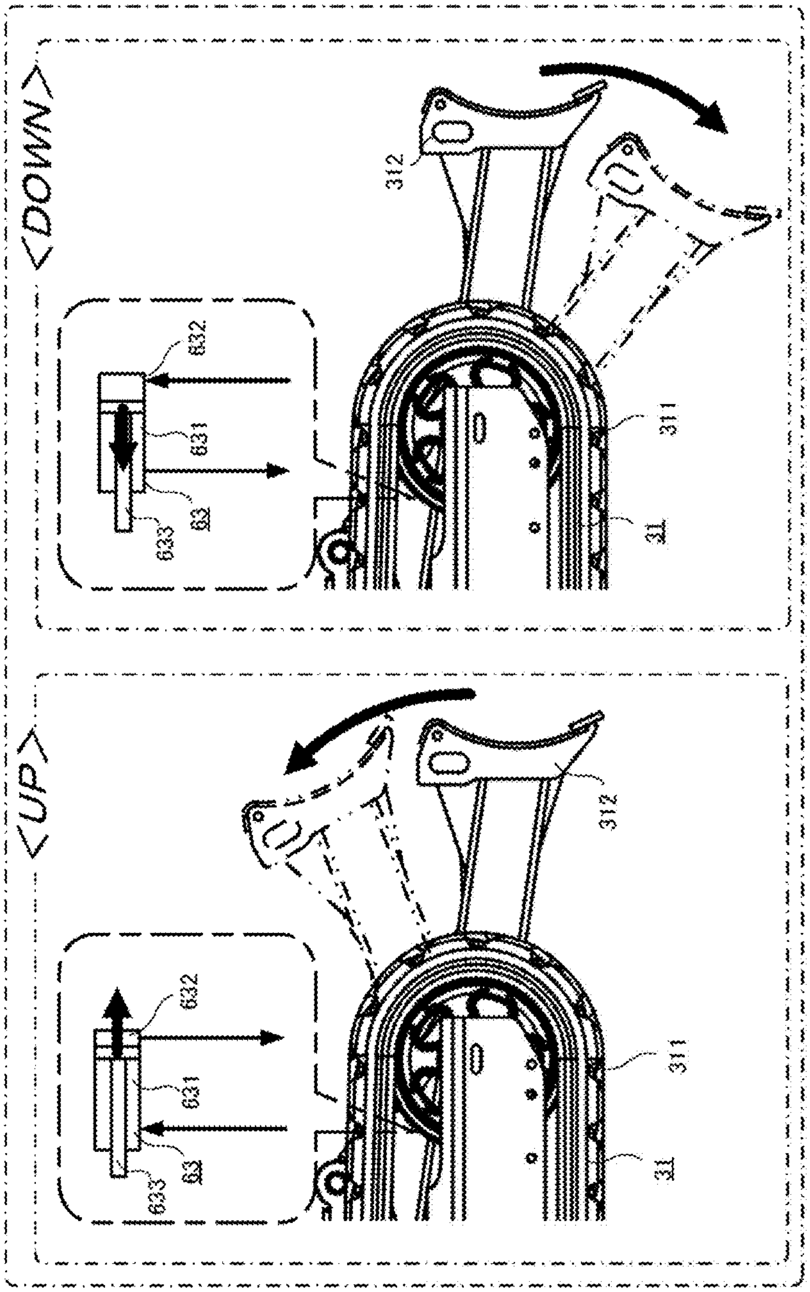
FIG. 4 is a schematic view explaining movement of a blade of the working machine according to the Embodiment 1.

As shown in FIG. 4, the blade 312 is configured to be able to move up and down with respect to the frame of the machine body 30 by the (lifting) hydraulic cylinder 63 attached to the blade 312. In the present embodiment, as an example, the hydraulic cylinder 63 is disposed above the blade 312, and when the hydraulic cylinder 63 contracts, the blade 312 moves upward, and when the hydraulic cylinder 63 extends, the blade 312 moves downward.

That is, the blade 312 can move in both directions between an upper end position (first position) indicated by an imaginary line (two-dot chain line) on the left side of FIG. 4 and a lower end position (second position) indicated by an imaginary line (two-dot chain line) on the right side of FIG. 4. The blade 312 moves from the upper end position (first position) toward the lower end position (second position) when moving downward and moves from the lower end position (second position) toward the upper end position (first position) when moving upward.

More specifically, as shown in FIG. 4, the hydraulic cylinder 63 includes a rod-side chamber 631, a bottom-side chamber 632, and a piston rod 633. The rod-side chamber 631 and the bottom-side chamber 632 are each provided with a port for connecting them to an oil passage of the hydraulic oil serving as a working fluid, so that the hydraulic oil can flow into or out of the rod-side chamber 631 and the bottom-side chamber 632.

As shown on the left side of FIG. 4, when the hydraulic oil is supplied to the rod-side chamber 631 of the hydraulic cylinder 63, the piston rod 633 moves in the contraction direction while the hydraulic cylinder 63 discharges the hydraulic oil in the bottom-side chamber 632. Thus, as shown on the left side of FIG. 4, when the hydraulic oil is supplied to the hydraulic cylinder 63 in such a direction that the hydraulic oil flows into the rod-side chamber 631 and the hydraulic oil flows out of the bottom-side chamber 632, the hydraulic cylinder 63 contracts to raise the blade 312. As a result, the blade 312 moves toward the upper end position (first position).

On the other hand, as shown on the right side of FIG. 4, when the hydraulic oil is supplied to the bottom-side chamber 632 of the hydraulic cylinder 63, the piston rod 633 moves in the extension direction while the hydraulic cylinder 63 discharges the hydraulic oil in the rod-side chamber 631. Thus, as shown on the right side of FIG. 4, when the hydraulic oil is supplied to the hydraulic cylinder 63 in such a direction that the hydraulic oil flows into the bottom-side chamber 632 and the hydraulic oil flows out of the rod-side chamber 631, the hydraulic cylinder 63 extends to lower the blade 312. As a result, the blade 312 moves toward the lower end position (second position).

Such an up-and-down movement of the blade 312 is performed according to the operation of the operation lever 21 of the operation device 2. That is, for example, when the operator tilts the operation lever 21 in the "upward direction", the direction and flow rate of the hydraulic oil from the hydraulic pump 41 to the hydraulic cylinder 63 are adjusted according to the amount of operation, and the hydraulic cylinder 63 contracts to raise the blade 312. Conversely, when the operator tilts the operation lever 21 in the "downward direction", the direction and flow rate of the hydraulic oil from the hydraulic pump 41 to the hydraulic cylinder 63 are adjusted according to the amount of operation, and the hydraulic cylinder 63 extends to lower the blade 312.

The working machine 3 according to the present embodiment has a jack-up function and a float function as functions of the blade 312.

The jack-up function is a function of moving the blade 312 to the lower end position (second position) side to lift a part of the machine body 30 from the ground by means of the blade 312, as shown in FIG. 3. In order to achieve such a jack-up function, the working machine 3 according to the present embodiment includes a backflow prevention circuit 7 (see FIG. 5) that prevents the hydraulic oil from flowing in a predetermined direction in the hydraulic cylinder 63 for driving the blade 312.

The backflow prevention circuit 7 prevents the flow of the hydraulic oil for moving the blade 312 from the lower end position (second position) toward the upper end position (first position). Specifically, the backflow prevention circuit 7 prevents the hydraulic oil from flowing out of the bottom-side chamber 632. This makes it possible to prevent the outflow of the hydraulic oil from the bottom-side chamber 632, thereby preventing the blade 312 from moving toward the upper end position (first position) due to the weight of the machine body 30 itself during jacking-up.

Further, the float function is a function of passively moving the blade 312. In a float mode that activates the float function, the blade 312 is placed on the ground by its own weight. That is, in the float mode, the blade 312 moves downward by its own weight and moves upward due to the reaction force from the ground. As a result, the blade 312 passively moves up and down to follow the unevenness of the ground.

Figure 5:
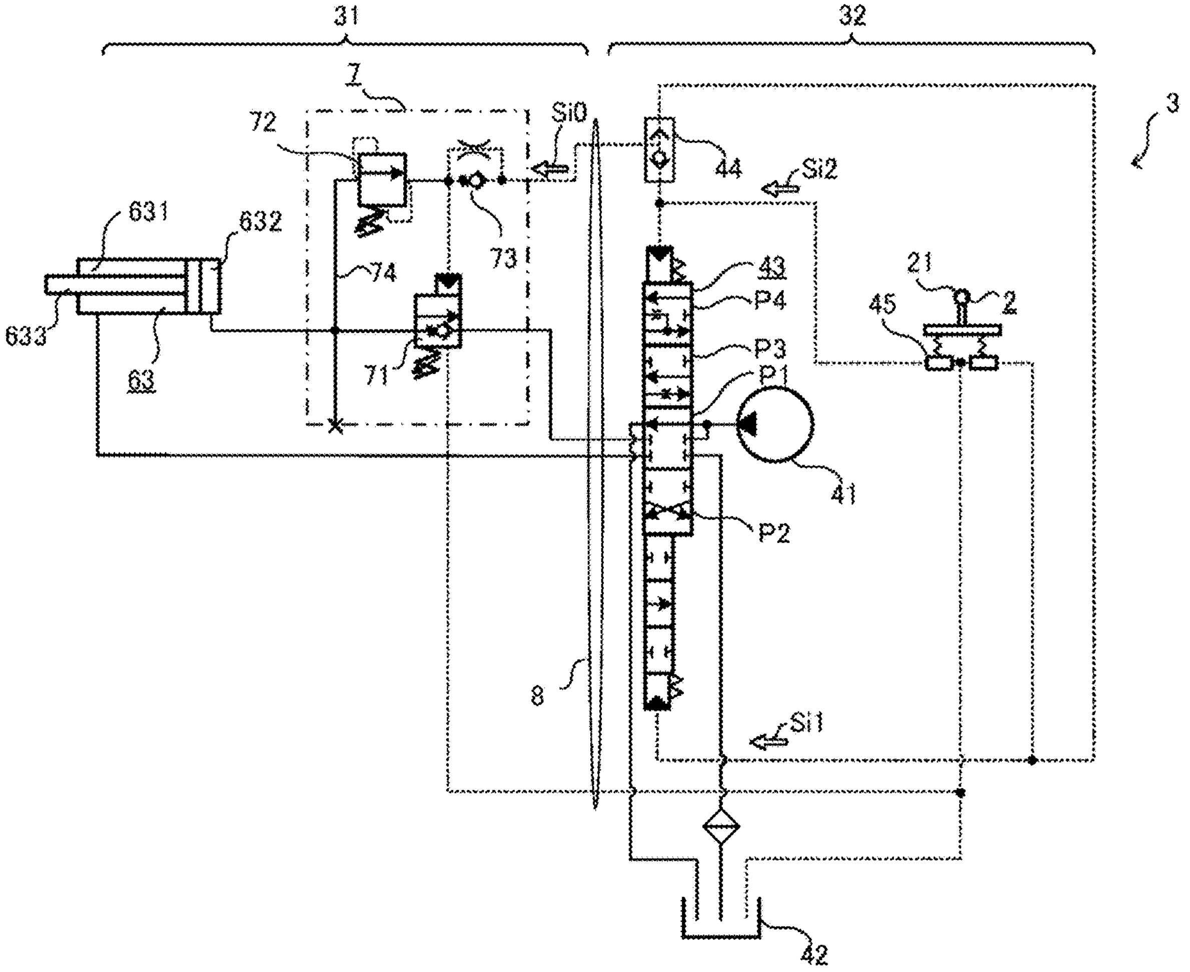
FIG. 5 is a schematic view illustrating a hydraulic circuit of the working machine according to the Embodiment 1.

In the float mode, the hydraulic cylinder 63 for driving the blade 312 is in a state where both the rod-side chamber 631 and the bottom-side chamber 632 are connected to the tank 42 (see FIG. 5). As a result, both the hydraulic oil in the rod-side chamber 631 and the hydraulic oil in the bottom-side chamber 632 can be freely discharged to the tank 42. Thus, when the blade 312 moves downward by its own weight, the hydraulic oil in the rod-side chamber 631 is discharged to the tank 42, and when the blade 312 moves upward due to the reaction force from the ground, the hydraulic oil in the bottom-side chamber 632 is discharged to the tank 42, causing the blades 312 to passively move up and down.

In the present embodiment, such a float mode is selected according to the operation of the operation lever 21 of the operation device 2. Specifically, when the operator tilts the operation lever 21 to the end point in the "downward direction" in a movable range, both the rod-side chamber 631 and the bottom-side chamber 632 in the hydraulic cylinder 63 are connected to the tank 42, and the float mode is set.

[3] Configuration of Hydraulic Circuit

Next, a configuration of the hydraulic circuit of the working machine 3 according to the present embodiment will be described with reference to FIG. 5. In FIG. 5, a solid line indicates a high-pressure oil passage (for hydraulic oil), and a dotted line indicates a low-pressure oil passage (for pilot oil).

As shown in FIG. 5, the working machine 3 includes, in addition to the hydraulic pump 41, the tank 42, the remote control valve 45, the backflow prevention circuit 7, and the hydraulic cylinder 63, a directional switching valve (control valve) 43 and a shuttle valve 44. FIG. 5 shows a hydraulic circuit related to the hydraulic cylinder 63 for driving the blade 312, and illustration of other hydraulic circuits is omitted as appropriate.

The directional switching valve 43 is a pilot-type directional switching valve capable of switching the direction and flow rate of the hydraulic oil from the hydraulic pump 41, and is driven by a pilot signal (pilot oil) serving as an input command supplied from the pilot pump. Specifically, the directional switching valve 43 has a neutral position P1, an upward position P2, a downward position P3, and a float position P4, and one position is selected from these four positions (P1 to P4) as a spool is moved by the pilot signal.

For example, when the neutral position P1 is selected in the directional switching valve 43, the directional switching valve 43 causes the hydraulic oil from the hydraulic pump 41 to flow to the tank 42 but not to the hydraulic cylinder 63. Similarly, when the float position P4 is selected in the directional switching valve 43, the directional switching valve 43 causes the hydraulic oil from the hydraulic pump 41 to flow to the tank 42 but not to the hydraulic cylinder 63.

On the other hand, when the upward position P2 is selected in the directional switching valve 43, the directional switching valve 43 supplies the hydraulic oil from the hydraulic pump 41 to the rod-side chamber 631 of the hydraulic cylinder 63, thereby contracting the hydraulic cylinder 63 to move the blade 312 upward. Further, when the downward position P2 is selected in the directional switching valve 43, the directional switching valve 43 supplies the hydraulic oil from the hydraulic pump 41 to the bottom-side chamber 632 of the hydraulic cylinder 63, thereby extending the hydraulic cylinder 63 to move the blade 312 downward.

The remote control valve 45 is provided in the pilot oil supply passage to the directional switching valve 43 corresponding to the hydraulic cylinder 63. The remote control valve 45 outputs an up-and-down operation command according to the operation of the operation lever 21 of the operation device 2 for operating the blade 312 to control the direction and flow rate of the hydraulic oil supplied to the hydraulic cylinder 63, thereby controlling the operation state of the blades 312. The up-and-down operation command instructs the up-and-down movement (moving upward, moving downward, floating, etc.) of the blade 312.

Specifically, an upward signal Si1, which is a pilot signal output from the remote control valve 45 when the operation lever 21 is operated in the "upward direction" and a downward signal Si2, which is a pilot signal output from the remote control valve 45 when the operation lever 21 is operated in the "downward direction" are input to the directional switching valve 43.

When the upward signal Si1 is input, the directional switching valve 43 moves the spool to the upward position P2 and contracts the hydraulic cylinder 63 to move the blade 312 upward. On the other hand, when the downward signal Si2 is input, the directional switching valve 43 moves the spool to the downward position P3 and extends the hydraulic cylinder 63 to move the blade 312 downward. Further, when the operation lever 21 is operated to the end point in the "downward direction" in the movable range, the directional switching valve 43 receives the downward signal Si2 and moves the spool to the float position P4, thereby causing the blade 312 to move in the float mode.

The backflow prevention circuit 7 includes a pilot-operated check valve 71, a relief valve 72, and a check valve 73, as shown in FIG. 5.

The pilot-operated check valve 71 is a check valve whose function is disabled by input of the pilot signal Si0. The pilot-operated check valve 71 is inserted between the directional switching valve 43 and the bottom-side chamber 632 of the hydraulic cylinder 63, and functions as a check valve that prevents the flow of the hydraulic oil from the bottom-side chamber 632 of the hydraulic cylinder 63 toward the directional switching valve 43. That is, the pilot-operated check valve 71 allows the hydraulic oil to pass only from the directional switching valve 43 toward the bottom-side chamber 632 of the hydraulic cylinder 63 when the pilot signal Si0 is not input. When the pilot signal Si0 is input to the pilot-operated check valve 71, the pilot-operated check valve 71 allows the hydraulic oil to pass in both directions.

In the present embodiment, the pilot-operated check valve 71 is connected to both ends of the remote control valve 45 via the shuttle valve 44. As a result, of the upward signal Si1 and the downward signal Si2 output from the remote control valve 45, the signal on the high pressure side is input to the pilot-operated check valve 71 via the shuttle valve 44 as the pilot signal Si0.

The relief valve 72 is provided on a branch passage 74 branching from the hydraulic oil passage between the bottom-side chamber 632 of the hydraulic cylinder 63 and the directional switching valve 43. The relief valve 72 opens to allow the passage of the hydraulic oil when the pressure of (the hydraulic oil in) the branch passage 74 exceeds a threshold value.

The check valve 73 is inserted between the pilot-operated check valve 71 and the shuttle valve 44 and functions as a check valve that prevents the flow of the hydraulic oil from the pilot-operated check valve 71 toward the shuttle valve 44. As a result, the hydraulic oil in the branch passage 74 that has passed through the relief valve 72 can be prevented from flowing back to the upstream side (shuttle valve 44 side) of the pilot signal Si0.

Further, in the present embodiment, the hydraulic cylinder 63 and the backflow prevention circuit 7 are mounted in the traveling portion 31, and the hydraulic pump 41, the tank 42, the directional switching valve 43, the shuttle valve 44, the remote control valve 45, and the like are mounted in the turning portion 32. Thus, the passage of the pilot oil between (the check valve 73 of) the backflow prevention circuit 7 and the shuttle valve 44, and the passage of the hydraulic oil between the hydraulic cylinder 63 and the backflow prevention circuit 7, and the directional switching valve 43 are connected via a swivel joint 8.

In summary, the working machine 3 according to the present embodiment controls the supply of the working fluid to the actuator that drives the driven object by the pilot signal Si0 of the operation system generated according to the operation of the operation device 2, thereby moving the driven object bidirectionally between the first position and the second position. The working machine 3 includes the backflow prevention circuit 7 that prevents the flow of the working fluid in the direction to move the driven object from the second position to the first position. The working machine 3 further includes a disabling circuit (including the shuttle valve 44). The disabling circuit disables the backflow prevention circuit 7 by the pilot signal Si0 generated during a specific operation, thereby allowing the flow of the working fluid in the direction to move the driven object from the second position to the first position.

In the present embodiment, the blade 312 is an example of the "driven object", and the hydraulic cylinder 63 is an example of the "actuator". Further, the hydraulic oil is an example of the "working fluid", and the shuttle valve 44 is an example of the "disabling circuit".

That is, except during the specific operation, in the working machine 3, the flow of the hydraulic oil (working fluid) in the direction to move the blade 312 (driven target) from the lower end position (second position) to the upper end position (first position) is prevented by the backflow prevention circuit 7. That is, the backflow prevention circuit 7 prevents the hydraulic oil from flowing out of the bottom-side chamber 632, so that, during jacking up, the hydraulic oil can be prevented from flowing out of the bottom-side chamber 632, and the blade 312 can be prevented from moving toward the upper end position (first position) due to the weight of the machine body 30 itself.

Further, during the specific operation, in the working machine 3, the backflow prevention circuit 7 is disabled by the pilot signal Si0, allowing the hydraulic oil (working fluid) to flow in the direction to move the blade 312 (driven target) from the lower end position (second position) to the upper end position (first position). Thus, for example, in the float mode in which the operation lever 21 is operated in the "downward direction", it is possible to allow the flow of the hydraulic oil in the direction to move the blade 312 from the lower end position to the upper end position and cause the blade 312 to passively move up and down.

Thus, in the working machine 3 according to the present embodiment, the backflow prevention circuit 7 is provided to prevent the machine body 30 from falling due to its own weight during jacking up or the like. On the other hand, when the directional switching valve 43 is at the float position P4, the blade 312 can be moved upward, allowing the blade 312 to be freely moved up and down. As a result, it is possible to achieve the working machine 3 that can be easily made multifunctional.

[4] Working Vehicle Control Method

Figure 6:
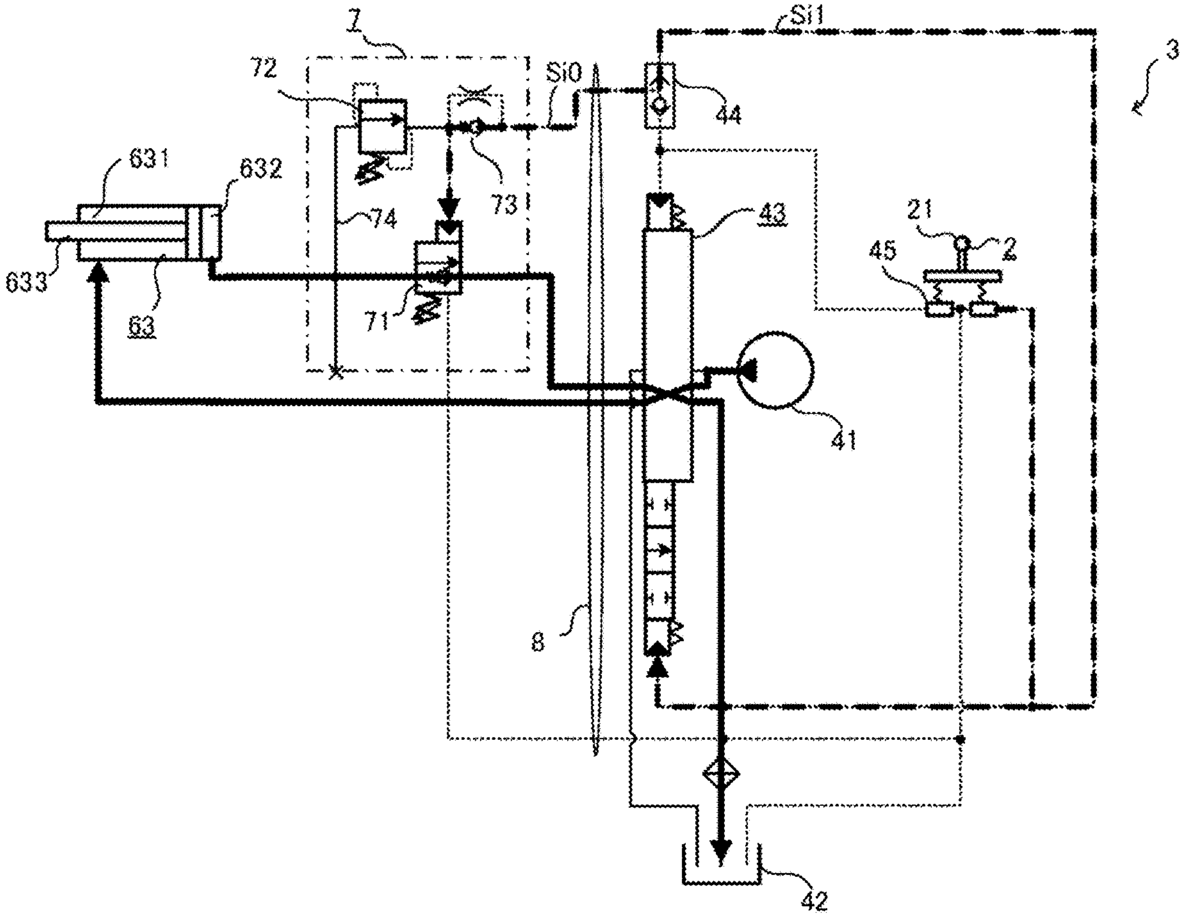
FIG. 6 is a schematic view illustrating the hydraulic circuit during a lifting operation of the working machine according to the Embodiment 1.
Figure 7:
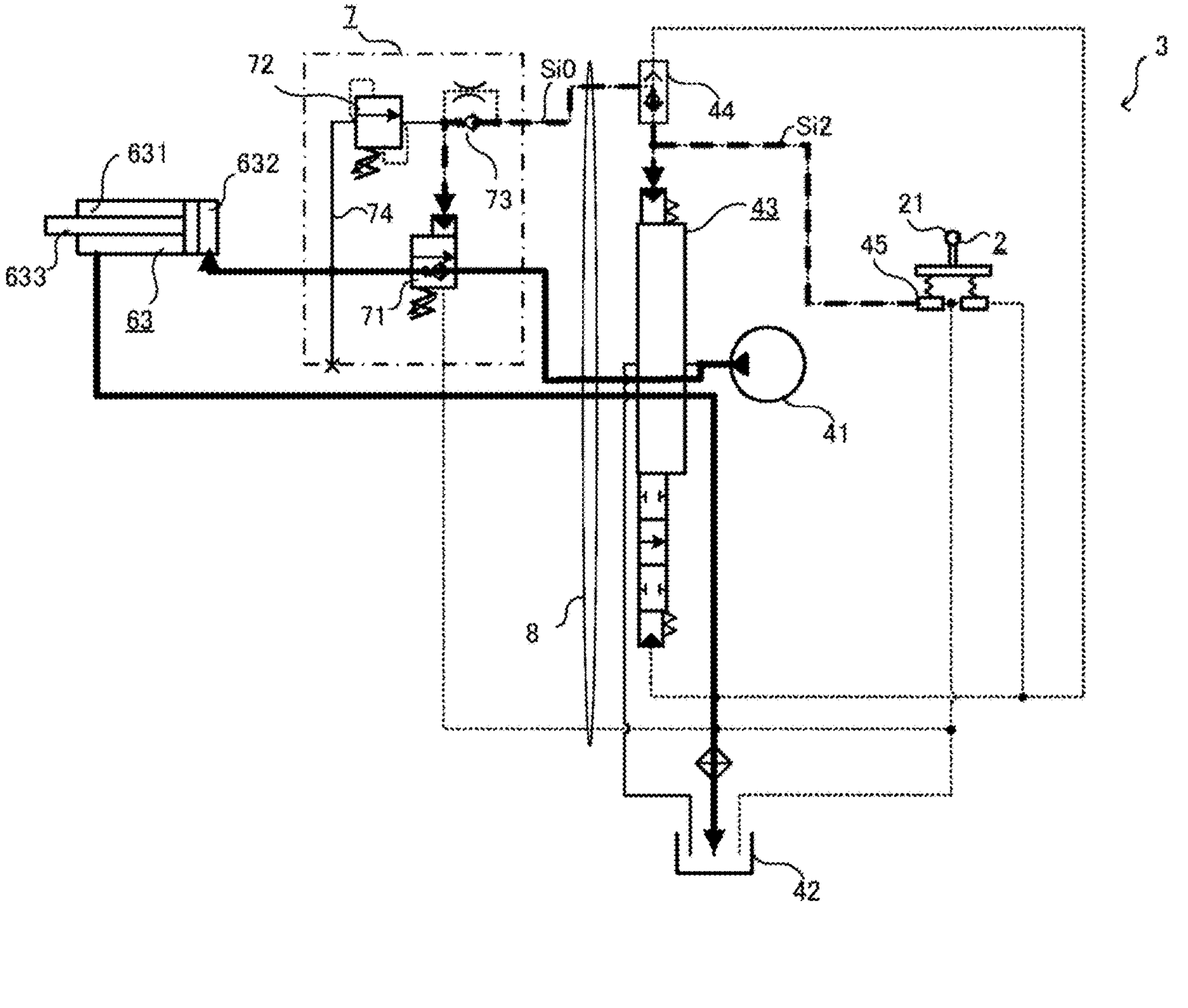
FIG. 7 is a schematic view illustrating the hydraulic circuit during a lowering operation of the working machine according to the Embodiment 1.
Figure 8:
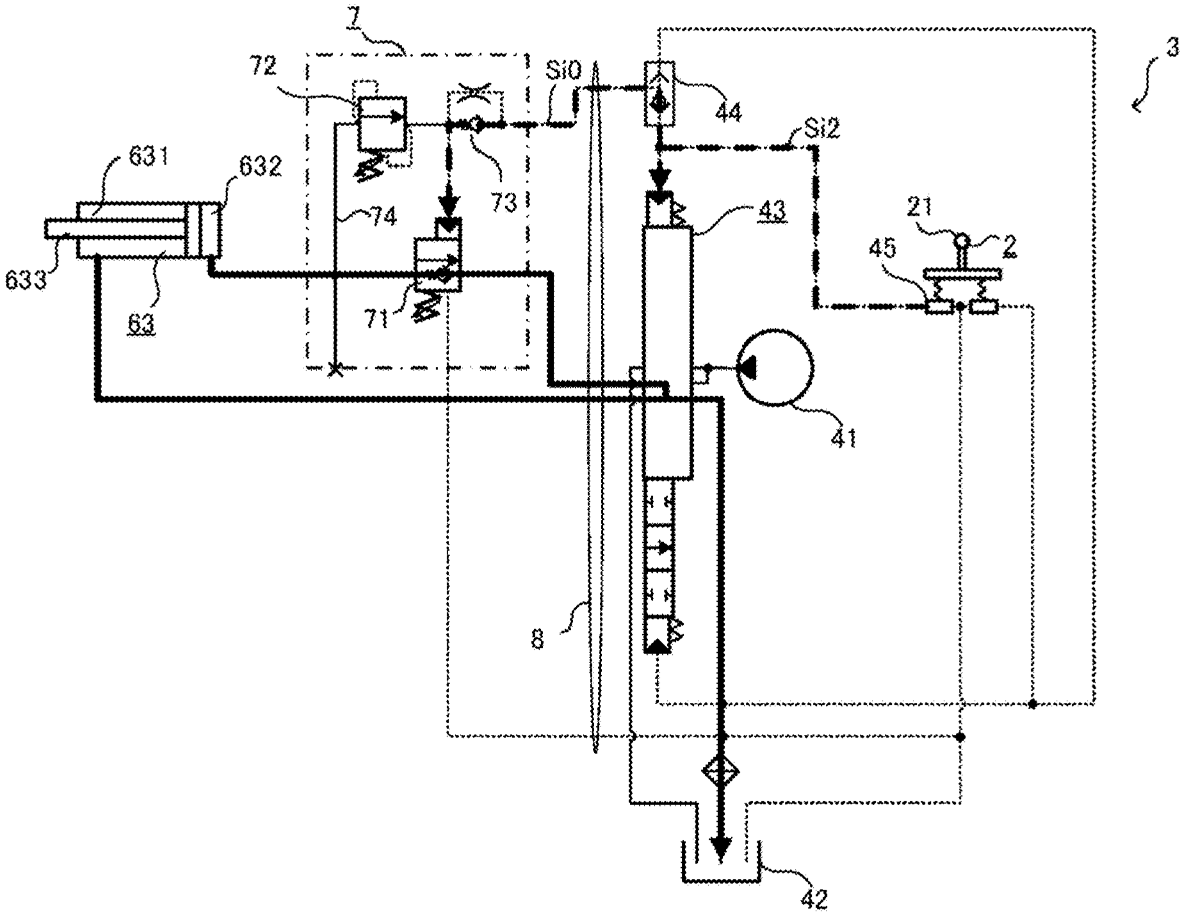
FIG. 8 is a schematic view illustrating the hydraulic circuit during a float operation of the working machine according to the Embodiment 1.

Next, a method for controlling the working machine 3 according to the present embodiment will be described with reference to FIG. 6 to FIG. 8. In FIG. 6 to FIG. 8, as in FIG. 5, the solid line indicates a high-pressure oil passage (for hydraulic oil), and the dotted line indicates a low-pressure oil passage (for pilot oil). Further, in FIG. 6 to FIG. 8, the pressurized pilot signal (pilot pressure) and a flow of the hydraulic oil are indicated by thick arrows.

The method for controlling the working machine 3 according to the present embodiment controls the supply of the working fluid to the actuator that drives the driven object by the pilot signal Si0 of the operation system generated according to the operation of the operation device 2, thereby moving the driven object bidirectionally between the first position and the second position. This control method includes preventing the flow of the working fluid in the direction to move the driven object from the second position to the first position by the backflow prevention circuit 7. This control method further includes disabling the backflow prevention circuit 7 by the pilot signal Si0 generated during the specific operation, thereby allowing the working fluid to flow in the direction to move the driven object from the second position to the first position.

That is, according to the method for controlling the working machine 3 according to the present embodiment, except during the specific operation, in the working machine 3, the flow of the hydraulic oil (working fluid) in a direction to move the blade 312 (driven object) from the lower end position (second position) to the upper end position (first position) is prevented by the backflow prevention circuit 7. Further, during the specific operation, in the working machine 3, the backflow prevention circuit 7 is disabled by the pilot signal Si0 to allow the hydraulic oil (working fluid) to flow in the direction to move the blade 312 (driven object) from the lower end position (second position) to the upper end position (first position). Thus, according to the method for controlling the working machine 3 according to the present embodiment, the backflow prevention circuit 7 is provided to prevent the machine body 30 from falling due to its own weight during jacking up and the like. On the other hand, when the directional switching valve 43 is at the float position P4, the blade 312 can be moved upward, allowing the blade 312 to be freely moved up and down. As a result, it is possible to achieve the method for controlling the working machine 3 that can be easily made multifunctional.

Specifically, when the operation lever 21 is operated in the "upward direction", the spool of the directional switching valve 43 moves to the upward position P2, and as shown in FIG. 6, the directional switching valve 43 supplies the hydraulic oil from the hydraulic pump 41 to the rod-side chamber 631 of the hydraulic cylinder 63. At this time, the upward signal Si1 output from the remote control valve 45 is input to (the pilot-operated check valve 71 of) the backflow prevention circuit 7 as the pilot signal Si0 via the shuttle valve 44. As a result, the function of the pilot-operated check valve 71 as a check valve for preventing the flow of the hydraulic oil from the bottom-side chamber 632 of the hydraulic cylinder 63 toward the directional switching valve 43 is disabled.

Thus, in the state of FIG. 6, the backflow prevention circuit 7 is disabled between the bottom-side chamber 632 of the hydraulic cylinder 63 and the directional switching valve 43, allowing the hydraulic oil to flow in both directions. Thus, in this state, the flow of the hydraulic oil discharged from the bottom-side chamber 632 of the hydraulic cylinder 63 to the tank 42 via the directional switching valve 43 is not prevented, allowing the hydraulic cylinder 63 to contract to move the blade 312 upward.

On the other hand, when the operation lever 21 is operated in the "downward direction", the spool of the directional switching valve 43 moves to the downward position P3, and as shown in FIG. 7, the directional switching valve 43 supplies the hydraulic oil from the hydraulic pump 41 to the bottom-side chamber 632 of the hydraulic cylinder 63. At this time, the downward signal Si2 output from the remote control valve 45 is input to (the pilot-operated check valve 71 of) the backflow prevention circuit 7 as the pilot signal Si0 via the shuttle valve 44. As a result, the function of the pilot-operated check valve 71 as a check valve for preventing the flow of the hydraulic oil from the bottom-side chamber 632 of the hydraulic cylinder 63 toward the directional switching valve 43 is disabled.

Thus, in the state of FIG. 7, the backflow prevention circuit 7 is disabled between the bottom-side chamber 632 of the hydraulic cylinder 63 and the directional switching valve 43, allowing the hydraulic oil to flow in both directions. However, in this state, the hydraulic oil is originally supplied from the hydraulic pump 41 to the bottom-side chamber 632 of the hydraulic cylinder 63 via the directional switching valve 43. Thus, the hydraulic oil flows without being prevented by the backflow prevention circuit 7, allowing the hydraulic cylinder 63 to extend to move the blade 312 downward.

Further, when the operation lever 21 is operated to the end point in the "downward direction" in the movable range, the spool of the directional switching valve 43 moves to the float position P4, and as shown in FIG. 8, the directional switching valve 43 allows the hydraulic oil from the rod-side chamber 631 and the bottom-side chamber 632 of the hydraulic cylinder 63 to flow to the tank 42. At this time, the downward signal Si2 output from the remote control valve 45 is input to (the pilot-operated check valve 71 of) the backflow prevention circuit 7 as the pilot signal Si0 via the shuttle valve 44. As a result, the function of the pilot-operated check valve 71 as a check valve for preventing the flow of the hydraulic oil from the bottom-side chamber 632 of the hydraulic cylinder 63 toward the directional switching valve 43 is disabled.

Thus, in the state of FIG. 8, the backflow prevention circuit 7 is disabled between the bottom-side chamber 632 of the hydraulic cylinder 63 and the directional switching valve 43, allowing the hydraulic oil to flow in both directions. As a result, in the float mode, as shown in FIG. 8, the flow of the hydraulic oil discharged from the bottom-side chamber 632 of the hydraulic cylinder 63 to the tank 42 via the directional switching valve 43 is not prevented, allowing the blade 312 to be freely moved up and down.

Figure 9:
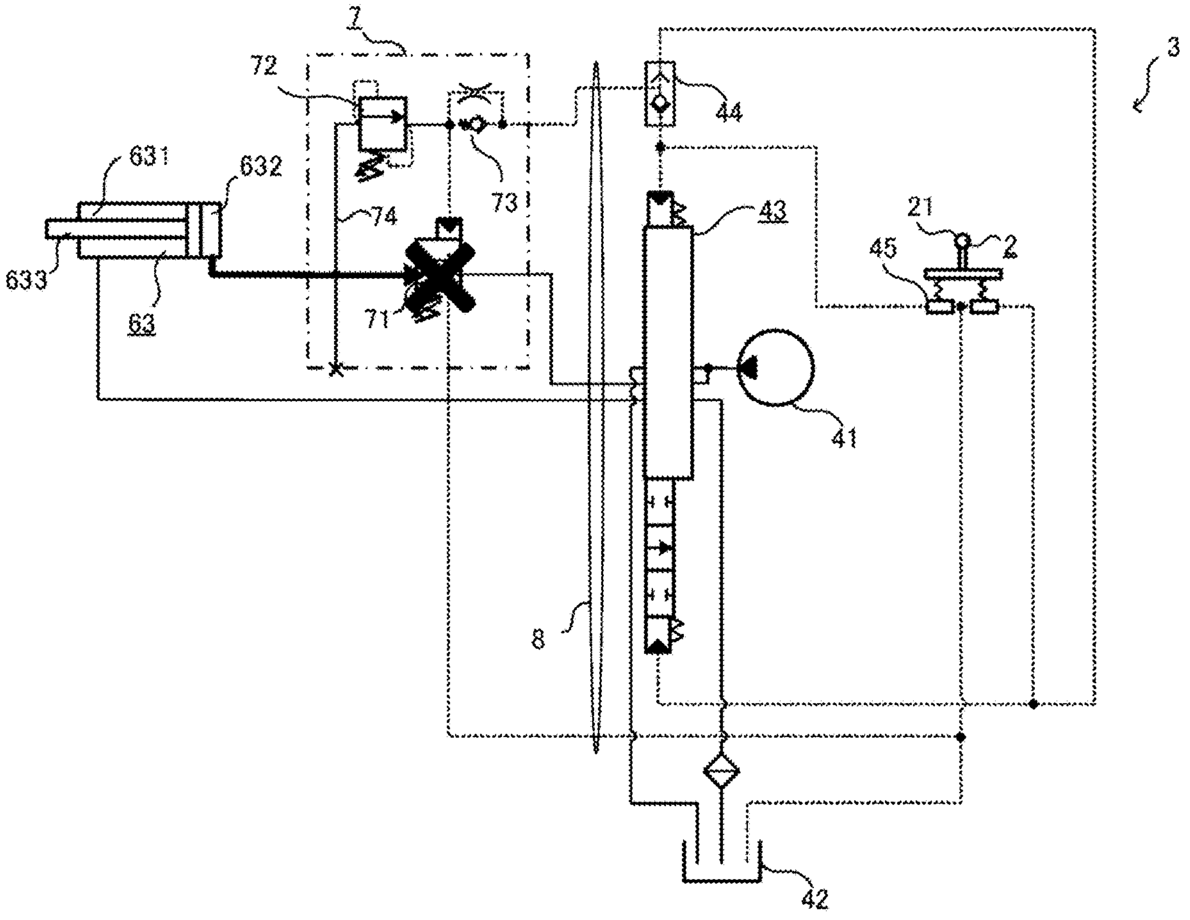
FIG. 9 is a schematic view illustrating the hydraulic circuit during non-operation of the working machine according to the Embodiment 1.

Further, when the operation lever 21 is not operated, the spool of the directional switching valve 43 is at the neutral position P1. At this time, as shown in FIG. 9, the pilot signal Si0 is not input to (the pilot-operated check valve 71 of) the backflow prevention circuit 7. Thus, the pilot-operated check valve 71 functions as a check valve for preventing the flow of hydraulic oil from the bottom-side chamber 632 of the hydraulic cylinder 63 toward the directional switching valve 43.

Thus, in the state of FIG. 9, the backflow prevention circuit 7 is enabled between the bottom-side chamber 632 of the hydraulic cylinder 63 and the directional switching valve 43, preventing the leakage of the hydraulic oil from the bottom-side chamber 632. As a result, this makes it possible to prevent the outflow of the hydraulic oil from the bottom-side chamber 632, thereby preventing the blade 312 from moving toward the upper end position (first position) due to the weight of the machine body 30 itself during jacking-up.

As described above, in the present embodiment, the specific operation includes a first operation for moving the driven object from the second position to the first position. That is, in the present embodiment, the specific operation includes the first operation (upward operation) in the direction to move the blade 312 (driven object) from the lower end position (second position) to the upper end position (first position). Thus, when the operation lever 21 is operated in the "upward direction", the backflow prevention circuit 7 is disabled by the pilot signal Si0 to achieve the upward movement of the blade 312.

Further, the specific operation includes a passive operation for passively moving the driven object between the first position and the second position. That is, in the present embodiment, the specific operation includes the operation (passive operation) for performing the float mode in which the blade 312 (driven object) is passively moved between the upper end position (first position) and the lower end position (second position). Thus, when the operation lever 21 is operated to the end point in the "downward direction" in the movable range, the backflow prevention circuit 7 is disabled by the pilot signal Si0 to achieve the passive up-and-down movement of the blade 312.

Further, in the present embodiment, either the first signal or the second signal is input to the backflow prevention circuit 7 via the shuttle valve 44 to disable the backflow prevention circuit 7. The first signal is the pilot signal Si0 generated during the first operation for moving the driven object from the second position to the first position. The second signal is the pilot signal Si0 generated during the second operation for moving the driven object from the first position to the second position.

That is, both the operation (first operation) in the "upward direction" for moving the blade 312 (driven object) from the lower end position (second position) to the upper end position (first position) and the operation (second operation) in the "downward direction" for moving the blade 312 from the upper end position to the lower end position are included in the specific operation. As a result, the backflow prevention circuit 7 can be disabled during both the first operation and the second operation with a relatively simple configuration using the shuttle valve 44.

Further, in the present embodiment, except during the specific operation, the flow of the working fluid in the direction to move the driven object from the second position to the first position is prevented by the backflow prevention circuit 7. For example, when the operation lever 21 is not operated, the directional switching valve 43 is at the neutral position P1. In this state, the backflow prevention circuit 7 is enabled and prevents the flow of the hydraulic oil (working fluid) from the bottom-side chamber 632 of the hydraulic cylinder 63 toward the directional switching valve 43. This makes it possible to prevent the outflow of the hydraulic oil from the bottom-side chamber 632, thereby preventing the blade 312 from moving toward the upper end position (first position) due to the weight of the machine body 30 itself, for example, during jacking-up.

Further, the backflow prevention circuit 7 includes the pilot-operated check valve 71 to which the pilot signal Si0 is input. This makes it possible to switch between enabling and disabling of the backflow prevention circuit 7 with a relatively simple configuration.

Further, the method for controlling the working machine 3 according to the present embodiment further includes disabling the backflow prevention circuit 7 when the pressure in the branch passage 74 branching from the working fluid passage from the actuator to the backflow prevention circuit 7 exceeds a threshold value. As a result, for example, when excessive external force is applied to the blade 312 (driven object) while the directional switching valve 43 is at the neutral position P1, the hydraulic oil (working fluid) in the bottom-side chamber 632 can be discharged to the tank 42 to release the impact. Thus, damage to the hydraulic cylinder 63 (actuator) can be easily avoided.

Specifically, if the pressure (of the hydraulic oil) in the branch passage 74 increases and exceeds the threshold value, the relief valve 72 is opened. Thus, the hydraulic oil is input to the pilot-operated check valve 71 via the relief valve 72 instead of the pilot signal Si0. As a result, the pilot-operated check valve 71 is disabled, and the hydraulic oil (working fluid) in the bottom-side chamber 632 can be discharged to the tank 42.

Further, the method for controlling the working machine 3 according to the present embodiment further includes preventing the backflow of the working fluid from the branch passage 74 to the upstream side of the pilot signal Si0 using the check valve 73. As a result, the backflow of the hydraulic oil (working fluid) from the relief valve 72 to the shuttle valve 44 can be prevented.

Figure 10:
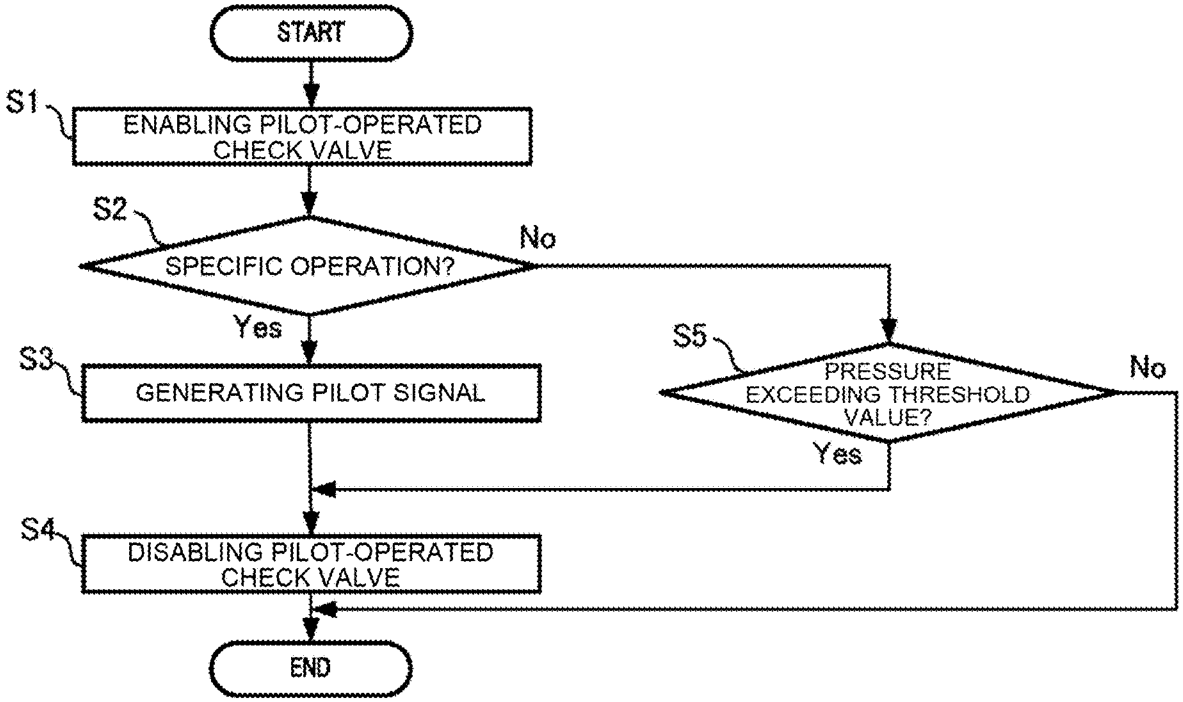
FIG. 10 is a flowchart illustrating a movement example of the working machine according to the Embodiment 1.

FIG. 10 is a flow chart showing an example of processing according to the control of the backflow prevention circuit 7 in the method for controlling the working machine 3 according to the present embodiment. As described above, the working machine 3 according to the present embodiment basically achieves a series of movements as shown in FIG. 10 with the configuration of the hydraulic circuit.

First, the backflow prevention circuit 7 enables the pilot-operated check valve 71 (S1). As a result, the flow of the hydraulic oil from the bottom-side chamber 632 of the hydraulic cylinder 63 toward the directional switching valve 43 is prevented. In the next step S2, it is determined whether the process proceeds to a step S3 or a step S5 depending on whether or not the operation device 2 is operated for the specific operation.

At this time, if the operation lever 21 is operated in either the "upward direction" or the "downward direction" from the neutral position, it means that the specific operation is being operated (S2: Yes), and the pilot signal Si0 is generated. (S3).

When the pilot signal Si0 is generated, in the backflow prevention circuit 7, the pilot-operated check valve 71 is enabled (S4). As a result, the flow of the hydraulic oil from the bottom-side chamber 632 of the hydraulic cylinder 63 toward the directional switching valve 43 is no longer prevented.

In the step S5, whether the process proceeds to a step S4 or skips a step S4 is determined depending on whether or not the pressure in the branch passage 74 exceeds a threshold value. At this time, if the pressure in the branch passage 74 exceeds the threshold value (S5: Yes), the relief valve 72 is being operated, and the pilot-operated check valve 71 in the backflow prevention circuit 7 is enabled (S4).

The working machine 3 repeatedly executes the processes of the steps S1 to S5 described above. However, the flowchart shown in FIG. 10 is merely an example. The processes may be added or omitted as appropriate, and the order of the processes may be changed as appropriate.

[5] Modifications

Modifications of the Embodiment 1 are listed below. Modifications described below can be applied in appropriate combination.

The control method in the present disclosure is not limited to being embodied by the hydraulic circuit configuration as in the Embodiment 1, and may be embodied by, for example, a control system including a computer system. The computer system is mainly composed of one or more processors and one or more memories as hardware. The method for controlling the working machine 3 in the present disclosure is achieved by the processor executing a program recorded in the memory of the computer system. The program may be pre-recorded in the memory of the computer system, may be provided via an electric communication line, or may be provided while being recorded in a non-temporary recording medium such as a computer system-readable memory card, optical disk, or hard disk drive. Further, some or all of the functional portions included in the control system may be configured by electronic circuits.

Further, it is not an essential configuration for the control system that at least part of the functions of the control system are integrated in one housing, and the constituent elements of the control system may be distributed over multiple housings. Further, at least part of the functions of the control system may be achieved by the cloud (cloud computing) or the like.

Further, the working fluid is not limited to the hydraulic oil, and may be, for example, gas such as the air, or other fluids. When the working fluid is the air, a pneumatic actuator driven by air pressure of compressed air or the like is used as the actuator.

Further, the driven object is not limited to the blade 312, and may be, for example, the boom 332.

Further, the operation lever 21 of the operation device 2 may be an electric operation device which is configured to output an electric signal (operation signal) according to the operation by the user (operator) to the control device, accepting the various operations by the user. In this case, the control device can control the hydraulic actuator by controlling, for example, a control valve (solenoid valve) provided in place of the remote control valve 45 according to the operation of the operation device 2 (operation lever 21).

REFERENCE SIGNS LIST

2 Operation device
3 Working machine
7 Backflow prevention circuit
44 Shuttle valve (disabling circuit)
63 Hydraulic cylinder (actuator)
71 Pilot-operated check valve
73 Check valve
312 Blade (driven object)
Si0 Pilot signal

The invention claimed is:

1. A method for controlling a working machine that controls, by a pilot signal generated according to an operation of an operation device, supply of a working fluid to an actuator that drives a driven object, thereby moving the driven object bidirectionally between a first position and a second position, the method comprising:

preventing a flow of the working fluid in a direction to move the driven object from the second position to the first position by a backflow prevention circuit; and disabling the backflow prevention circuit by the pilot signal generated during a specific operation, thereby allowing the flow of the working fluid in the direction to move the driven object from the second position to the first position, wherein the pilot signal is either a first signal generated during a first operation of the operation device for moving the driven object from the second position to the first position or a second signal generated during a second operation of the operation device for moving the driven object from the first position to the second position, and wherein either the first signal or the second signal, as the pilot signal, is input to the backflow prevention circuit via a shuttle valve, thereby disabling the backflow prevention circuit.

2. The method for controlling the working machine according to claim 1, wherein the specific operation includes a first operation for moving the driven object from the second position to the first position.

3. The method for controlling the working machine according to claim 1, wherein the specific operation includes a passive operation for passively moving the driven object between the first position and the second position.

4. The method for controlling the working machine according to claim 1, wherein, except during the specific operation, the flow of the working fluid in the direction to move the driven object from the second position to the first position is prevented by the backflow prevention circuit.

5. The method for controlling the working machine according to claim 1, wherein the backflow prevention circuit includes a pilot-operated check valve to which the pilot signal is input.

6. The method for controlling the working machine according to claim 1, further comprising disabling the backflow prevention circuit if a pressure in a branch passage branching from a working fluid passage from the actuator to the backflow prevention circuit exceeds a threshold value.

7. The method for controlling the working machine according to claim 6, further comprising preventing a backflow of the working fluid from the branch passage to an upstream side of the pilot signal by a check valve.

8. The method for controlling the working machine according to claim 1, wherein:

the first signal, when generated, is in fluid communication with a first inlet of the shuttle valve, and the second signal, when generated, is in fluid communication with a second inlet of the shuttle valve, the second inlet being different than the first inlet.

9. A working machine that controls, by a pilot signal generated according to an operation of an operation device, supply of a working fluid to an actuator that drives a driven object, thereby moving the driven object bidirectionally between a first position and a second position, the working machine comprising:

a backflow prevention circuit that prevents a flow of the working fluid in a direction to move the driven object from the second position to the first position; and shuttle valve that disables the backflow prevention circuit by the pilot signal generated during a specific operation, thereby allowing the flow of the working fluid in the direction to move the driven object from the second position to the first position, wherein the pilot signal is either a first signal generated during a first operation of the operation device for moving the driven object from the second position to the first position or a second signal generated during a second operation of the operation device for moving the driven object from the first position to the second position, and wherein either the first signal or the second signal, as the pilot signal, is input to the backflow prevention circuit via the shuttle valve, thereby disabling the backflow prevention circuit.

10. A method for controlling a working machine that controls, by a pilot signal generated according to an operation of an operation device, supply of a working fluid to an actuator that drives a driven object, thereby moving the driven object bidirectionally between a first position and a second position, the method comprising:

preventing a flow of the working fluid in a direction to move the driven object from the second position to the first position by a backflow prevention circuit;

disabling the backflow prevention circuit if a pressure in a branch passage branching from a working fluid passage from the actuator to the backflow prevention circuit exceeds a threshold value, thereby allowing the flow of the working fluid in the direction to move the driven object from the second position to the first position; and preventing a backflow of the working fluid from the branch passage to an upstream side of the pilot signal by a check valve.

* * * * *